United States Patent
McLarty et al.

(10) Patent No.: US 11,549,865 B2
(45) Date of Patent: Jan. 10, 2023

(54) SYSTEM AND METHOD FOR MONITORING CONTROL DATA AND NOTIFYING A PROGRAM OF A MACHINE

(71) Applicant: MACHINEMETRICS, INC., Northampton, MA (US)

(72) Inventors: Hugh McLarty, Palo Alto, CA (US); Lou Zhang, Northampton, MA (US)

(73) Assignee: MACHINEMETRICS, INC., Northampton, MA (US)

( * ) Notice: Subject to any disclaimer, the term of this patent is extended or adjusted under 35 U.S.C. 154(b) by 190 days.

(21) Appl. No.: 17/150,573

(22) Filed: Jan. 15, 2021

(65) Prior Publication Data

US 2022/0228952 A1   Jul. 21, 2022

(51) Int. Cl.
*G01M 99/00* (2011.01)
*G05B 19/042* (2006.01)
*G05B 23/02* (2006.01)

(52) U.S. Cl.
CPC ......... *G01M 99/005* (2013.01); *G05B 19/042* (2013.01); *G05B 23/0221* (2013.01); *G05B 23/0264* (2013.01); *G05B 2219/25268* (2013.01)

(58) Field of Classification Search
CPC ............... G01M 99/005; G05B 19/042; G05B 23/0221; G05B 23/0264; G05B 2219/25268; G05B 23/027; Y02P 90/02
See application file for complete search history.

(56) References Cited

U.S. PATENT DOCUMENTS

| | | | | |
|---|---|---|---|---|
| 3,878,983 A * | 4/1975 | Hamill, III | ............. | G05B 19/42 700/88 |
| 5,546,533 A * | 8/1996 | Koyama | ............. | G06F 11/2089 714/5.1 |
| 5,701,830 A * | 12/1997 | Muto | ............. | D05B 19/10 112/102.5 |
| 5,927,874 A * | 7/1999 | Kikuta | ............. | G06K 15/10 347/172 |
| 2013/0091335 A1* | 4/2013 | Mulcahy | ............. | G06F 11/2025 714/E11.132 |
| 2017/0076072 A1* | 3/2017 | Koren | ............. | G06F 21/105 |
| 2021/0004265 A1* | 1/2021 | Guim Bernat | ............. | G06F 1/26 |
| 2021/0208992 A1* | 7/2021 | Vega | ............. | G06F 9/5088 |
| 2022/0284306 A1* | 9/2022 | Osogami | ............. | B60W 50/0097 |

* cited by examiner

*Primary Examiner* — Mohammad K Islam
(74) *Attorney, Agent, or Firm* — Grogan, Tuccillo & Vanderleeden, LLP (57) ABSTRACT

A device and a method of monitoring a machine. The method includes interfacing an edge device with the machine and detecting a condition of the machine with the edge device. The method identifies the condition with the edge device and sends a signal identifying the condition to a program running on the machine. The signal of the edge device communicates with the program through a register of recorded values and the edge device checks the register and notifies the program by altering a value in the recorded values of the register to a signal value. The program reads the recorded values in the register and initiates an action in the machine when the signal value is present in the recorded values of the register.

20 Claims, 7 Drawing Sheets

SYSTEM AND METHOD FOR MONITORING CONTROL DATA AND NOTIFYING A PROGRAM OF A MACHINE

BACKGROUND

Technical Field

Embodiments of the invention relate generally to the monitoring of machines to allow for preventative maintenance in manufacturing processes and to prevent waste, and more specifically, to a system and method for monitoring of machine control data and notifying a program on the machine.

Discussion of Art

In the machining space, it is generally important to detect various metrics of a machine to determine if the machine is performing in an anomalous way, i.e., in a manner outside the normal and/or intended operating parameters/metrics of the machine, e.g., in a manner that may result in a defective part. With the digitization of factories, it is common to connect individual manufacturing machines, such as CNC (i.e., Computer Numerical Control) machines, to computers allowing software to monitor and analyze the operation of the machines. In production, a CNC machine executes a potentially complex CNC program, similar to a computer program, that directs the machine through numerous motions and operations to produce a part. This is often done in a repeating cycle to produce multiple parts of the same design. These machining programs are written by hand and/or are generated by computer programs known as CAM (i.e., Computer-Aided Manufacturing) software. It is common for CNC programs to evolve over time, to be modified by multiple people, and to be run on more than one CNC machine. It is also common for different CNC programs to be loaded and run on a given CNC machine, sometimes several different programs are loaded and run in one day. The human operators who supervise the CNC machine often have limited CNC programming skills and are not familiar with the details of programs running on the machines they operate. Employees who individually understood a given CNC program may no longer work at the factory or in the area where it used.

It is difficult to monitor the control data metrics measured by the sensors on the machines to ensure efficient production of parts by machines when the machines contain CNC programs that change over time and can be replaced entirely.

External software that monitors a machine may be created and operated by a third party, e.g., not by the factory owners and not by the makers of the CNC machines. The third party must constantly adapt the external software to ascertain the desired control data resulting in software that is prohibitively inefficient.

What is needed, therefore, is an improved system and method for the monitoring machine anomalies via control data and notifying a program of the machine.

BRIEF DESCRIPTION

In an embodiment, a method of monitoring a machine includes: interfacing an edge device with the machine; detecting a condition of the machine with the edge device; identifying the condition with the edge device; and sending a signal identifying the condition to a program running on the machine. The signal of the edge device communicates with the program through a register of recorded values and the edge device checks the register and notifies the program by altering an unused value in the recorded values of the register to a signal value.

In another embodiment, a peripheral edge device includes: a machine having a memory module; and a machine interface connector configured to detect and identify a condition of the machine and to send a signal identifying the condition to a program running on the memory module of the machine. The signal of the edge device communicates with the program through a register of recorded values and the edge device checks the register and notifies the program by altering an unused value in the recorded values of the register to a signal value.

DRAWINGS

The present invention will be better understood from reading the following description of non-limiting embodiments, with reference to the attached drawings, wherein below.

DETAILED DESCRIPTION

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. As used herein, "electrically coupled", "electrically connected", and "electrical communication" mean that the referenced elements are directly or indirectly connected such that an electrical current may flow from one to the other. The connection may include a direct conductive connection, i.e., without an intervening capacitive, inductive or active element, an inductive connection, a capacitive connection, and/or any other suitable electrical connection. Intervening components may be present. The term "real-time", as used herein means a level of processing responsiveness that a user senses as sufficiently immediate or that enables the processor to keep up with an external process. As used herein, the term "control data" means any type of data which governs the behavior of a machine, e.g., speed data, feed rate data, load data.

As will be appreciated, embodiments of the present invention use domain knowledge, machine learning, to facilitate new ways of requesting and acquiring control data to break down a machining task/process into smaller pieces in order to continuously monitor a number of distinct machine metrics.

Further, while the embodiments disclosed herein are described with respect to the machining industry, it is to be understood that embodiments of the present invention may be applicable to other fields/systems/processes in which a device is subjected to repetitive stresses that may detrimentally affect end product quality.

Figure 1:
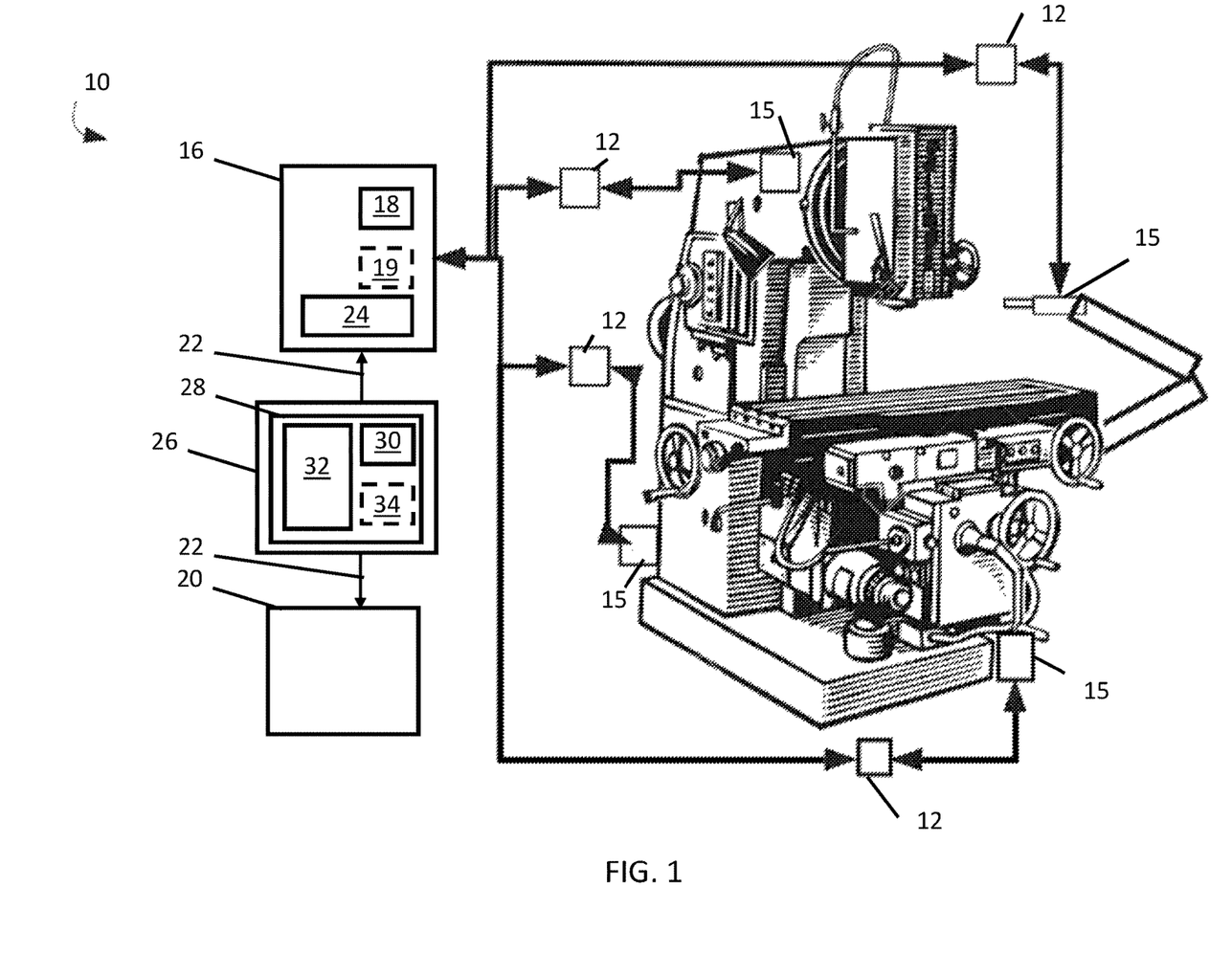
FIG. 1 is a diagram of a system for monitoring of machine metrics via control data, in accordance with an embodiment of the present invention.

Referring now to FIG. 1, the major components of a system 10 for monitoring machine metrics via control data 12 detected by one or more sensors 15, in accordance with an embodiment of the present invention, are shown. The system 10 includes a machine 14 having a memory module 16 and a machine interface connector or edge device 20 that is configured to detect and identify a condition 18 of the machine 14 and to send a signal 22 identifying the condition 18 to a program 24 running on the memory module 16 of the machine 14. The signal 22 of the edge device 20 communicates with the program 24 through a register 26 of recorded values 28 and the edge device 20 checks 50 the register 26 and notifies 52 the program 24 by altering an unused value 32 in the recorded values 28 of the register 26 to a signal value 30. The program 24 initiates an action in response to the notification by the edge device 20. For example, the edge device 20 detects that a cutting tool being used by the machine 14 is approaching the end of its useful life and signals the machine 14. The machine 14 can then stop and wait for human intervention or automatically switch to a fresh tool and continue with its work without producing defective parts and with minimal waste, as dictated by the program 24.

The edge device 20 and the memory module 16 of the machine 14 agree on the register 26. This agreement is the result of: conversations between the operators of the edge device 20 and the programmers of the program 24, an announcement by either party of a preferred choice for the register 26 requiring the other party to use this register 26, or the program 24 could automatically negotiate the register 26 through a suitable protocol. The device 10 has no fixed or standard register 26. The register 26 can be different on each machine 14, can be different for each different program 24 that runs on the machine 14 (some machines frequently switch between different programs), and/or can automatically change (e.g., as a security measure). If the program 24 does not receive signals via the register 26, the program 24 is free to use the register 26 for any normal purpose, or not at all. If a second program 25 (not depicted) is loaded and run on machine 14 (a common occurrence) the method 42 will continue to function. Unless the second program 25 also alters the unused value 32 of the register 26, the edge device 20 will never attempt to signal 22 the machine 14 or modify the register 26. In embodiments, the edge device 20 reports an error condition if a second signal 25 also alters the unused value 32 of the register 26. Even if the register 26 is accidentally set to the unused value 32 or left at the unused value 32 by a previous program and the register 26 is then changed to the signal value 30 by the edge device 20, there will be no effect on the operation of the second program 25 unless that program also contains instructions to react to that specific change in the values of the register 26. It is highly unlikely that the second program 25 would actively use the register 26 for another purpose (while leaving the unused value 32 in the register 26 for any length of time). This handshake involving the unused value 32 and the signal value 30 of the register 26 is not found in other programs in the art, which also allows a shop to replace and/or upgrade a machine 14 without fear of losing effectiveness of the method 40.

The machine 14 may be any type of manufacturing device operative to generate/process a plurality of parts in a repetitive manner, e.g., a press, drill, saw, etc. The machine 14 may have one or more operating parameters/metrics such as load, speeds, feed rates, etc.

The one or more sensors 15 may include load sensors, speed sensors, feed rate sensors, etc. In embodiments, the one or more sensors 15 may be embedded/integrated into the machine 14, disposed on external surfaces of the machine, and disposed at a distance from the machine 14. The one or more sensors 15 may be mechanical, e.g., a spring-based load sensors, magnetic, e.g., a rotational pickup, optical, e.g., lasers, or other types of sensors that are operative to detect/sense control data 12 from the machine 14. In other words, the one or more sensors 15 may be any type of sensor that provides data concerning an operating parameter of the machine 14 used to control operation of the machine 14. For example, in embodiments, the one or more sensors 15 may be internal to the machine 14 and necessary for operation of the machine 14.

In embodiments, the one or more sensors 15 may further include a part counter, i.e., a device that detects when the machine 14 has finished processing/generating a part and/or tracks the number of parts made by the machine 14.

In embodiments, the memory module 16 also includes at least one processor. For example, in embodiments, the memory module 16 may be a dedicated process logic controller ("PLC") or a general-purpose computer such as a desktop/laptop. The memory module 16 may include, and/or electronically communicate with, a database that stores the control data 12. The memory module 16 may be at the same site/location as the machine 14, or in embodiments, located at a different site from the machine 14. The memory module 16 may electronically communicate with the one or more sensors 15 via communication links which, like the link between the memory module 16 and the edge device 20, may be wired and/or wireless.

While FIG. 1 depicts the memory module 16 and edge device 20 as apart from the machine 14, in embodiments, the memory module 16 and/or edge device 20 may be integrated into the machine 14. Accordingly, in embodiments, the system 10 may further include the machine 14.

Figure 2:
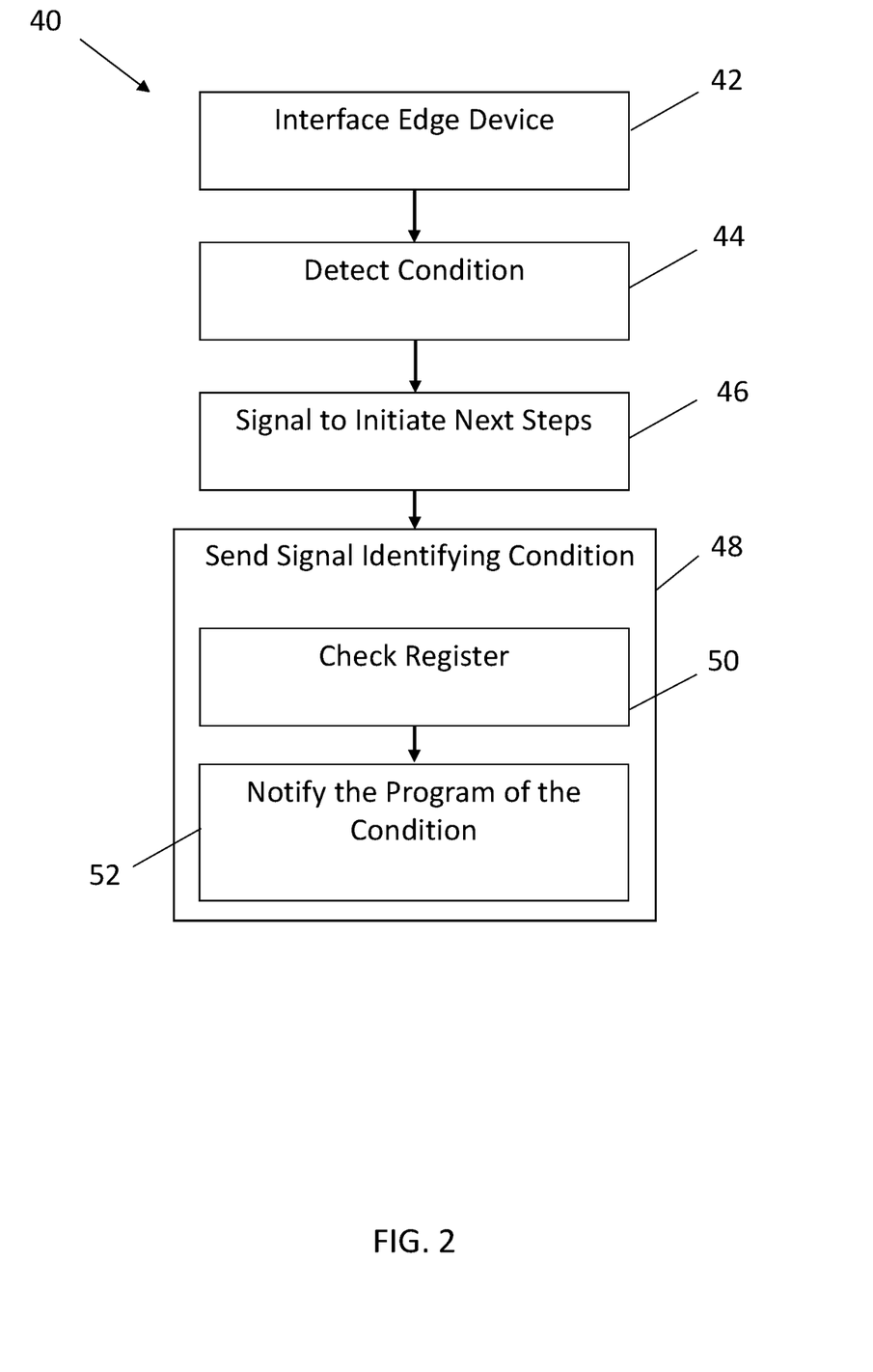
FIG. 2 is a flow chart depicting a method for monitoring machine of machine metrics via control data, in accordance with an embodiment of the present invention.

Turning now to FIG. 2, a method 40 for monitoring a machine 14 utilizing the system 10, in accordance with an embodiment of the present invention, is shown. The method 40 includes: interfacing 42 an edge device 20 with the machine 14; detecting 44 a condition 18 of the machine 14 with the edge device 20; identifying 46 the condition 18 with the edge device 20; and sending 48 a signal 22 identifying the condition 18 to a program 24 running on the machine 14. The signal 22 of the edge device 20 communicates 48 with the program 24 through a register 26 of recorded values 28 and the edge device 20 checks 50 the register 26 and notifies 52 the program 24 by altering an unused value 32 in the register 26 to a signal value 30. The program 24 initiates an action in response to the notification by the edge device 30. For example, if the unused value 32 is the number "1313" and the signal value 30 is the number "86" when the program 24 finds the signal value 30 of "86" the program 24 assumes it has been sent the signal 22, e.g., "Tool 5 is about to fail", and the program 24 takes appropriate action such as stopping to allow tool 5 to be replaced, notifying a human operator, shutting down spinning parts, turning off coolant sprays, etc. If this machine 14 is operating in a repeating cycle, the program 24 sets a value in the register 26 again to the unused value 32 of "1313" to indicate the willingness of the program 24 to receive the signal 22 from the edge device 20 and resumes monitoring for a new occurrence of the condition 18. The values of the unused value 32 and the signal value 30 are reasonably chosen to make undesirable scenarios extremely unlikely.

The method 40 flexibly communicates 48 a signal 22 from an external computing system in the form of the edge device 20 to a programmable manufacturing machine 14 while achieving at least three goals. First, the method 40 effectively divides responsibility for analysis and classification to the external computing system in the form of edge device 20 and for deciding how and when to respond to the monitored machine 14 and its programming (i.e., program 24). Second, the method 40 minimizes the additional work required from the programmers of the program 24 of the machine 14. Third, the method 40 minimizes the risk of the external system in the form of the edge device 20 miscommunicating or interfering with the monitored machine 14. According to the method 40, the program 24 ultimately issues the command to the machine 14 rather than the external system in the form of the edge device 20. As a result, the program 24 ultimately determines whether and when to notice the signal of the edge device 20 and how the machine 14 responds to the signal 22. It is common that there are better times and worse times (i.e., risky, destructive, expensive, etc.) to interrupt the program 24 running on the machine 14. The method 40 places these decisions on qualified parties in the program 24 and therefore the programmer of the machine 14. This allows the owner and/or the programmer of the edge device 20 to limit or eliminate responsibility of the specific response of the machine 14.

The edge device 20 communicates with the machine 14 over a communication channel using a control protocol that allows the program 24 running on the machine 14 to examine and set some of the values in the register 26. In embodiments, the edge device 20 is a small industrial computer, communicating via the FOCAS (i.e., FANUC Open CNC API Specification) protocol over an ethernet cable to a CNC machine 14 with a memory module 16 in the form of a Fanuc 31*i* control unit. The program 24 of this memory module 16 runs in G-code or any other widely used CNC programming language and the edge device 20 can read and set the values of the register 26 in the form of macro variables.

Figure 3:
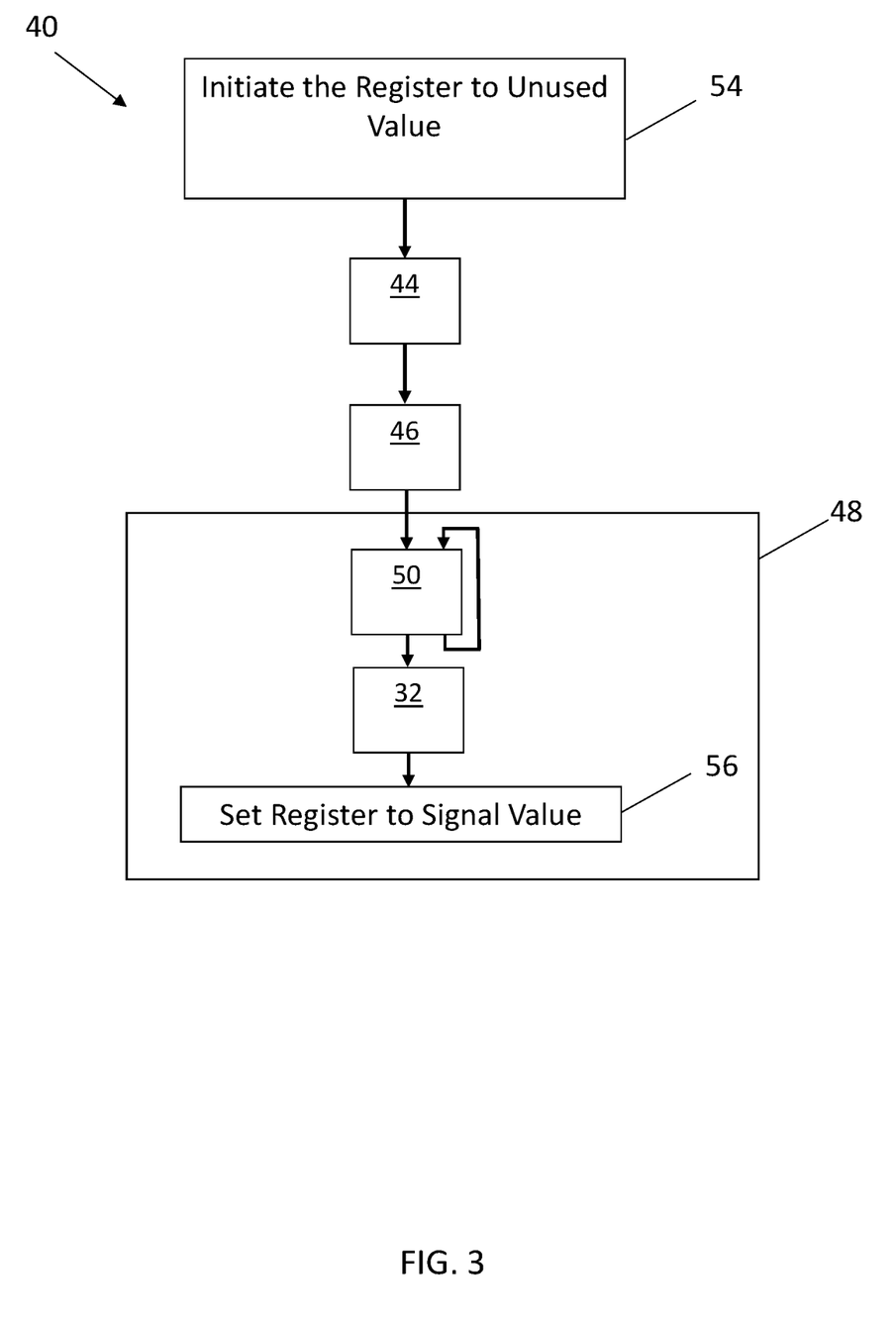
FIG. 3 is another flow chart depicting a portion of the method of FIG. 2, in accordance with an embodiment of the present invention.

In the embodiment depicted in FIG. 3, the method 40 includes initializing 54 the register 26 to an unused value 32, e.g., when the program 24 starts operation. The edge device 20 repeats the step of checking 50 the value 30 of the register 26 if the value is any value other than the unused value 32 and sets 56 the register 26 to the signal value 30 if the value is the unused value 32.

Figure 4:
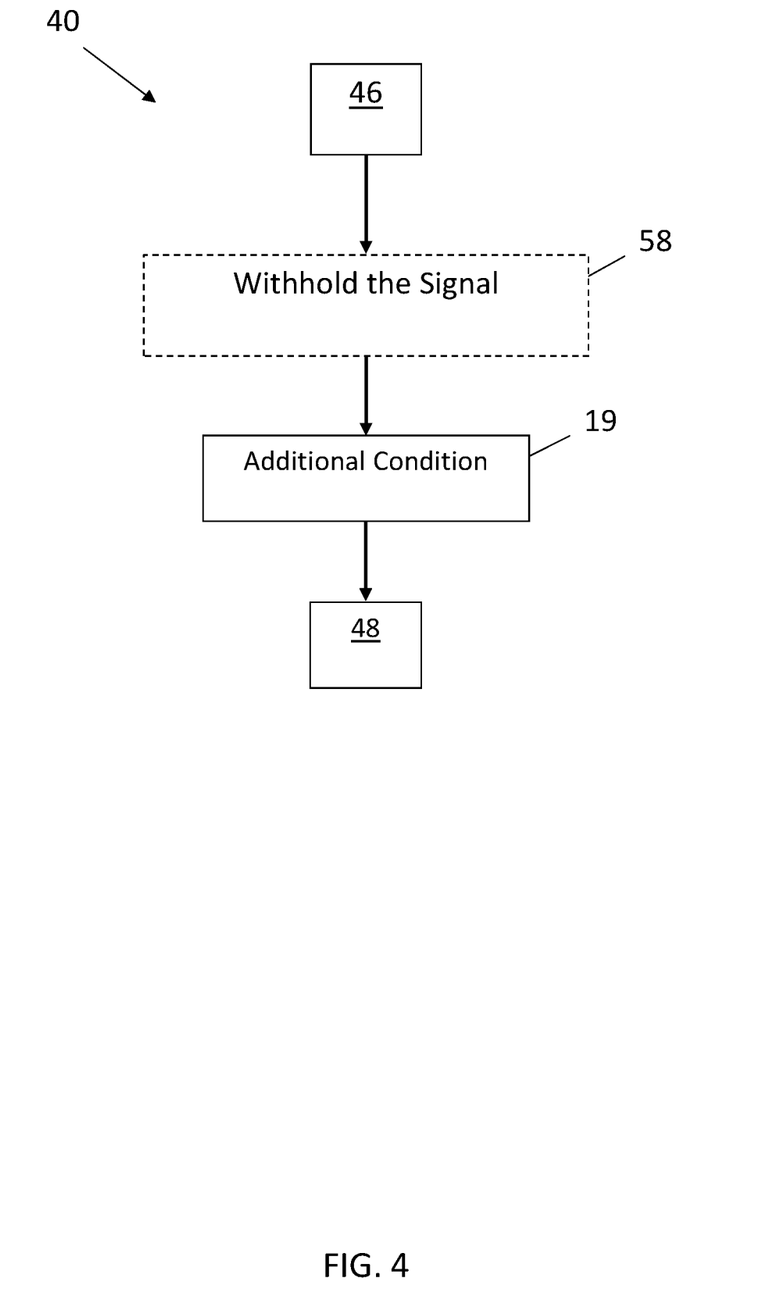
FIG. 4 is another flow chart depicting a portion of the method of FIG. 2, in accordance with an embodiment of the present invention.

Referring to FIG. 4, the method 40 includes the step of withholding 58 the signal 22 from the program 24 after the step of identifying 46 the condition 18 until at least one additional condition 19 is met. The additional condition 19 includes, but is not limited to: the program 24 is actively executing, the program 24 has a selected name or number, a scheduled temporal period is occurring (e.g., it must be after 6:00 AM at the shop, or before 8:00 PM, a weekend day, etc.), keywords occur in a comments field of the program 24, and as indicated by an external input. For example, a condition 18 could be "Tool 5 is about to fail" and the action by the program 24 could be "stop as soon as practical to allow tool 5 to be replaced".

Figure 5:
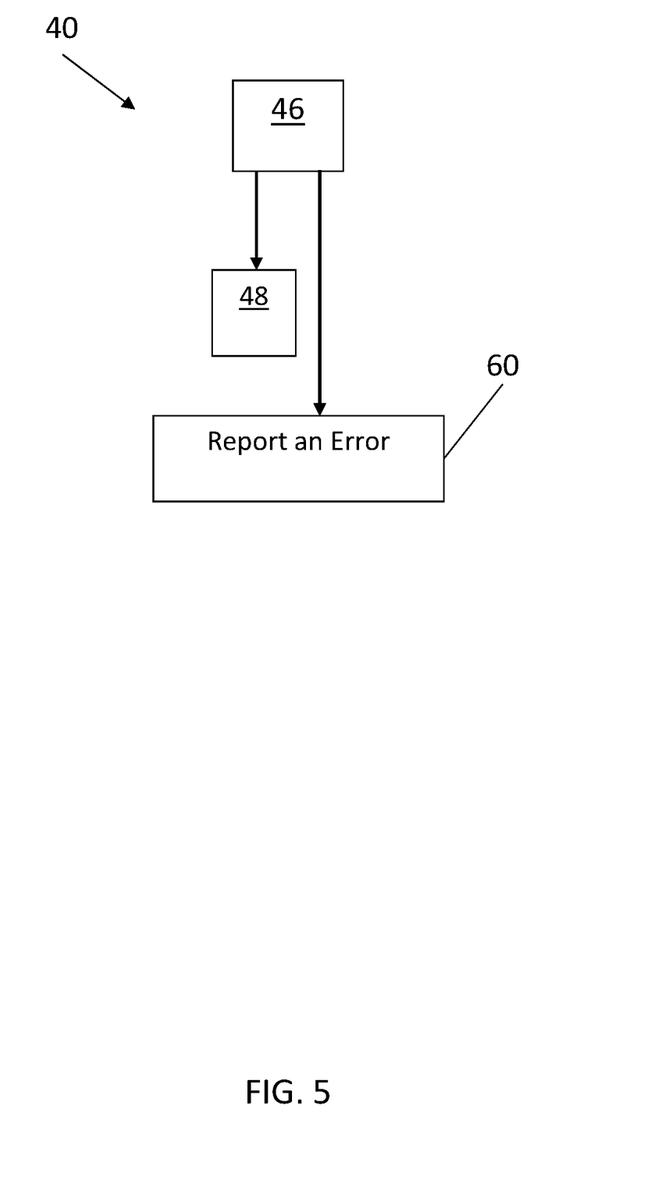
FIG. 5 is another flow chart depicting a portion of the method of FIG. 2, in accordance with an embodiment of the present invention.

Referring to FIG. 5, the method 40 includes the step of reporting 60 an error if the edge device 20 is unable to send the signal 22 for a period of time, if the edge device 20 is unable to send the signal 22 for a number of cycles, if the machine 14 completes the number of cycles, and/or if the machine 14 enters a specialized state (e.g., the machine is shutdown).

In embodiments, the signal 22 is nonbinary and the signal value 30 is altered based on the nonbinary signal 22. For example, the signal 22 is a number N in the range of 1-99 and can be sent by placing the signal value 30 plus the number N into the register 26. The machine program 24 recovers this value by computing the value in the register 26 minus the signal value 30 (assuming the signal value plus the number N is not equal to the unused value 32 for anu used value of N).

Figure 6:
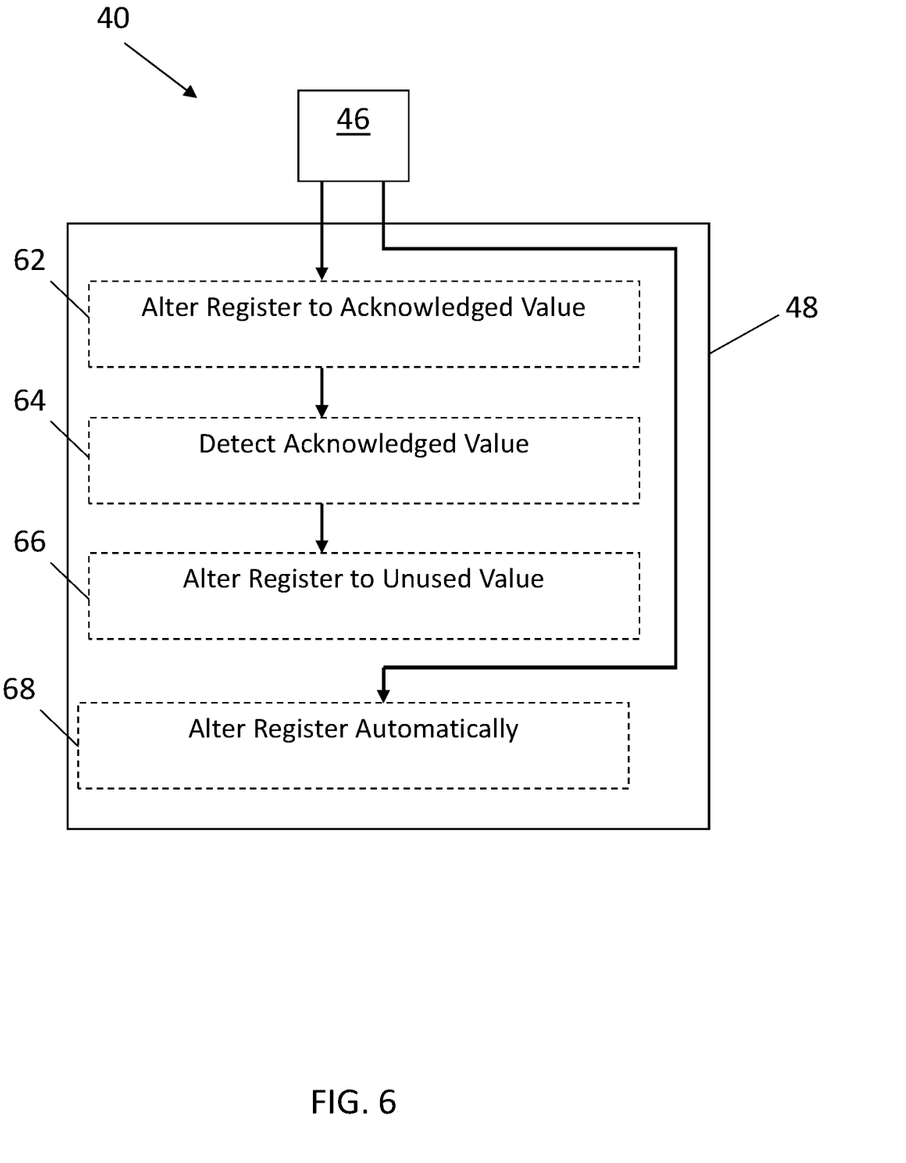
FIG. 6 is another flow chart depicting a portion of the method of FIG. 2, in accordance with an embodiment of the present invention.

Referring now to FIG. 6, the method 40 also includes the steps of: altering 62 the register 26 to an acknowledged value 34; detecting 64 the acknowledged value 34 in the register 26; and altering 66 the register 26 to the unused value 32. In some embodiments, the method 40 includes altering 68 the register 26 automatically after a specific period of time.

Figure 7:
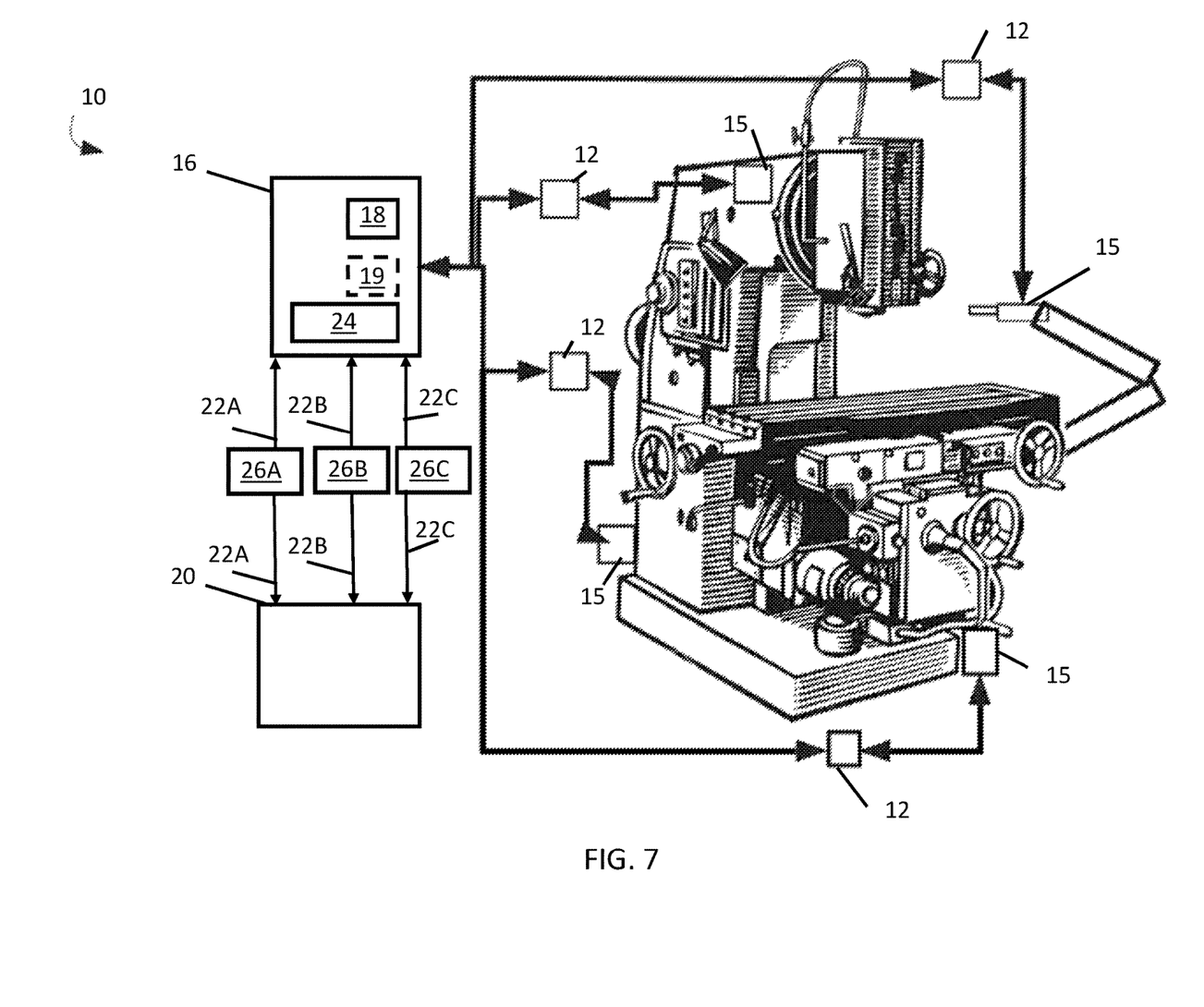
FIG. 7 is another diagram of a system for monitoring of machine metrics via control data, in accordance with an embodiment of the present invention.

Referring now to FIG. 7, a first signal 22A communicates through a first register 26A, a second signal 22B communicates through a second register 26B, and a third signal 22C communicates through a third register 26C.

The control data 12 includes, but is not limited to, CNC machine spindle speed.

Finally, it is also to be understood that the system 10 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein, which may be in real-time. For example, as previously mentioned, the system may include at least one processor and system memory/data storage structures, which may include random access memory (RAM) and read-only memory (ROM). The at least one processor of the system 10 may include one or more conventional microprocessors and one or more supplementary co-processors such as math co-processors or the like. The data storage structures discussed herein may include an appropriate combination of magnetic, optical and/or semiconductor memory, and may include, for example, RAM, ROM, flash drive, an optical disc such as a compact disc and/or a hard disk or drive.

Additionally, a software application that adapts the controller to perform the methods disclosed herein may be read into a main memory of the at least one processor from a computer-readable medium. The term "computer-readable medium", as used herein, refers to any medium that provides or participates in providing instructions to the at least one processor of the system 10 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

While in embodiments, the execution of sequences of instructions in the software application causes at least one processor to perform the methods/processes described herein, hard-wired circuitry may be used in place of, or in combination with, software instructions for implementation of the methods/processes of the present invention. Therefore, embodiments of the present invention are not limited to any specific combination of hardware and/or software.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

Additionally, while the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format are not intended to be interpreted as such, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A method of monitoring a machine, the method comprising:
    interfacing an edge device with the machine;
    detecting a condition of the machine with the edge device;
    identifying the condition with the edge device; and
    sending a signal identifying the condition to a program running on the machine,
    wherein the signal of the edge device communicates with the program through a register of recorded values and the edge device checks the register and notifies the program by altering an unused value in the recorded values of the register to a signal value.

2. The method of claim 1, further comprising: reading the register with the program and initiating an action with the program when the signal value is present in the recorded values of the register.

3. The method of claim 1, further comprising the steps of:
    initializing the register to the unused value during an initial operation period of the program.

4. The method of claim 1, wherein the edge device repeats the step of checking the value of the register if the value is any value other than the unused value and sets the register to the signal value if the value is the unused value.

5. The method of claim 1, further comprising the step of withholding the signal from the program after the step of identifying the condition until at least one additional condition is met.

6. The method of claim 5, wherein the additional condition includes: the program is actively executing, the program has a selected name or number, a scheduled temporal period is occurring, keywords occur in a comments field of the program, and an external input indicates the additional condition is present.

7. The method of claim 1, further comprising the step of reporting an error if the edge device is unable to send the signal for a period of time, if the edge device is unable to send the signal for a number of cycles, if the machine completes the number of cycles, and/or if the machine enters a specialized state.

8. The method of claim 7, wherein the specialized state is shutdown of the machine.

9. The method of claim 1, wherein the signal is nonbinary and the signal value is altered based on the nonbinary signal.

10. The method of claim 1, wherein the signal further comprises a first signal communicating through a first register, a second signal communicating through a second register, and a third signal communicating through a third register.

11. The method of claim 1, further comprising the steps of:
    altering the register to an acknowledged value;
    detecting the acknowledged value in the register; and
    altering the register to the unused value.

12. The method of claim 1, further comprising the steps of:
    altering the register automatically after a specific period of time.

13. A peripheral edge device comprising:

a machine having a memory module; and a machine interface connector configured to detect and identify a condition of the machine and to send a signal identifying the condition to a program running on the memory module of the machine, wherein the signal of the edge device communicates with the program through a register of recorded values and the edge device checks the register and notifies the program by altering an unused value in the recorded values of the register to a signal value.

14. The peripheral edge device of claim 13, wherein the program reads the recorded values in the register and initiates an action in the machine when the signal value is present in the recorded values of the register.

15. The peripheral edge device of claim 13, wherein at least one of the program and the peripheral edge device initializes the register to the unused value during an initial operation period of the program.

16. The peripheral edge device of claim 13, wherein the edge device reads the value of the register and sets the register to the signal value if the value of the register is the unused value.

17. The peripheral edge device of claim 13, wherein the edge device withholds the signal from the program after identifying the condition until at least one additional condition is met.

18. The peripheral edge device of claim 17, wherein the additional condition includes: the program is actively executing, the program has a selected name or number, a scheduled temporal period is occurring, keywords occur in a comments field of the program, and an external input indicates the additional condition is present.

19. The peripheral edge device of claim 13, wherein the edge device initializes the register to an unused value when the program starts operation.

20. The peripheral edge device of claim 13, wherein the edge device alters the register to an acknowledged value, detects the acknowledged value in the register, and alters the register to the unused value.

\* \* \* \* \*